United States Patent [19] [11] Patent Number: 5,263,016
Minoda et al. [45] Date of Patent: Nov. 16, 1993

[54] INFORMATION RECORDING DISCS

[75] Inventors: Takeshi Minoda; Akira Todo; Toshio Kimura; Masayoshi Kurisu, all of Ichihara, Japan

[73] Assignee: Mitsui Petrochemical Industries, Ltd., Tokyo, Japan

[21] Appl. No.: 963,025

[22] Filed: Oct. 19, 1992

Related U.S. Application Data

[63] Continuation of Ser. No. 698,200, May 6, 1991, abandoned, which is a continuation of Ser. No. 224,708, Jul. 27, 1988, abandoned.

[30] Foreign Application Priority Data

Jul. 27, 1987 [JP] Japan .................. 62-114879

[51] Int. Cl.⁵ ................... G01D 15/34; G11B 7/24; G11B 7/26
[52] U.S. Cl. ................... 369/286; 369/284; 346/137; 346/135.1; 430/495; 430/945; 428/65
[58] Field of Search ........... 369/289, 290, 291, 270, 369/271, 280, 284, 281, 283, 286; 346/137, 135.1; 430/495, 945; 428/65

[56] References Cited

U.S. PATENT DOCUMENTS

| 4,710,913 | 12/1987 | Matsushima et al. | 369/280 |
| 4,720,826 | 1/1988 | Sugiyama et al. | 369/283 |
| 4,865,949 | 9/1989 | Yamamuro et al. | 346/137 |
| 4,870,429 | 9/1989 | Fujita et al. | 346/137 |
| 4,911,968 | 3/1990 | Higasihara et al. | 369/286 |
| 4,917,751 | 4/1990 | Olta et al. | 369/286 |

FOREIGN PATENT DOCUMENTS 0195720 9/1986 European Pat. Off. .
0199136 10/1986 European Pat. Off. .

Primary Examiner—Stuart S. Levy
Assistant Examiner—Joseph A. Rhoa
Attorney, Agent, or Firm—Sherman and Shalloway

[57] ABSTRACT

An information recording disc including a plurality of disc substrates (2), at least one of which has a recording medium containing layer (1), two pieces of hubs mounted over the center hole of said disc substrates on both sides thereof, each hub having a portion to be inserted into said center hole and a flange portion to cover a portion of said disc substrate in the vicinity of said center hole, and an adhesive layer (13, 14) formed between said hubs and said disc substrates and between said two hubs. An adhesive layer (7) laminates the substrates (2a, 2b) to one another.

4 Claims, 2 Drawing Sheets

INFORMATION RECORDING DISCS

This application is a continuation of application Ser. No. 07/698,200, filed May 6, 1991, now abandoned; which is a continuation of application Ser. No. 07/224,708 filed Jul. 27, 1988, now abandoned.

FIELD OF THE INVENTION

This invention relates to information recording discs which are useful for such purpose, for example, as optical discs.

BACKGROUND OF THE INVENTION

Information recording discs made of plastics to perform storing and reading of information by converging rays of light such as laser beam and the like on recording medium containing layers have been widely known, in which disc substrates each having a recording medium containing layer are laminated directly or via spacers with adhesives or by means of ultrasonic welding technique so that said layers face to each other. In such information recording discs, however, the laminated disc substrates are liable to come away from each other by exposure to temperature and moisture cycle employed during long-term service of the discs, and especially those laminated with spacers tend to come away from each other, starting from the inner peripheral side thereof, to which driving force is applied.

With view of obviating such problems as mentioned above, there have been proposed information recording disc reinforced by forming layers of cured resin (adhesive) on the edge surfaces of center holes of the laminated disc substrates (Japanese Patent Laid-open Publin. No. 175046/1984), and information recording discs in which the peripheral portion of the center hole of the laminated disc substrates are provided with holes annually perforated, cage-like connecting rods are inserted into the holes thus perforated, and metallic suction caps are fixed to both the upper and lower parts of the connecting rods thus inserted (Japanese Patent Laid-open Publin. No. 119747/1987).

In the information recording discs referred to above, however, there were involved such problems as will be mentioned below. That is, the former discs are weak in mechanical resistance to driving force from the inner peripheral portion, though are effective in resistance to the temperature and moisture cycle to which they are exposed, and the latter discs are much complicated in structure, require perforating operation and machine therefor when the laminated disc substrates are provided with the connecting rods, and involve difficulty in operation of inserting the connecting rods into the perforated disc substrates and fixing the metallic suction caps thereto.

OBJECT OF THE INVENTION

The present invention is intended to solve such problems associated with the prior art as mentioned above, and an object of the invention is to provide information recording discs which have the laminated portion of the inner peripheral portion of the disc substrate reinforced by virtue of employing a simple structure and, at the same time, in which the assembling operation thereof is easy and the anchoring strength obtained is high.

SUMMARY OF THE INVENTION

The present invention is directed to information recording discs comprising a plurality of laminated disc substrates, at least one of which has a recording medium containing layer, two pieces of hubs mounted over the center hole of the laminated disc substrate on both sides thereof, each hub having a portion to be inserted into said center hole and a flange portion to cover a portion of the laminated disc substrate in the vicinity of said center hole, and adhesive layers to be formed between said hubs and said laminated disc substrates and between said hubs.

BRIEF DESCRIPTION OF THE DRAWINGS

In the accompanying drawings.

Figure 1:
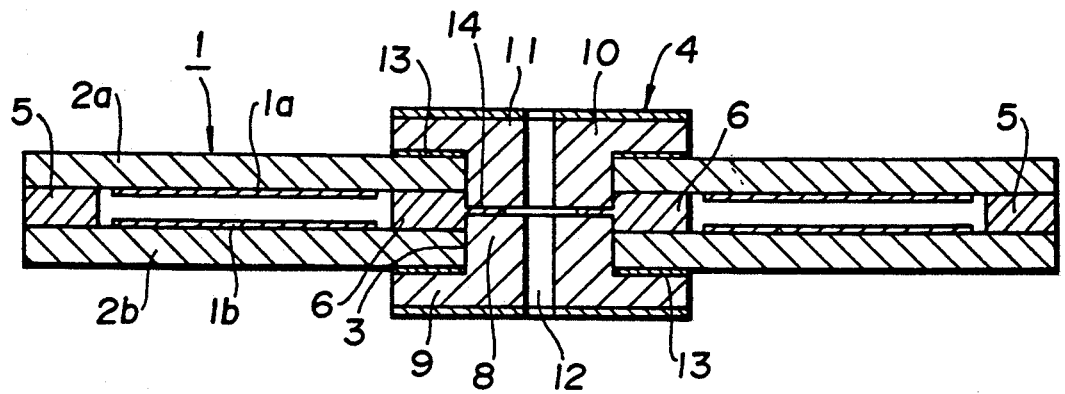
FIGS. 1 and 2 are sectional views showing separate embodiments of the invention, respectively.

In the figures, the same signs represent the same or corresponding portions, where 1 is an information recording disc, 2a and 2b are disc substrates, 3 is a center hole, 4 is a hub, 5 is an outer peripheral spacer, 6 is an inner peripheral spacer, 7, 13 and 14 are adhesive layers, 8 is a portion of hub to be inserted into the center hole, 9 is a flange portion of hub, and 10 is a main body of hub.

DETAILED DESCRIPTION OF THE INVENTION

The information recording discs of the present invention comprise a plurality of laminated disc substrates usually two laminated disc substrates, at least one of which has a recording medium containing layer, two pieces of hubs to be mounted over the center hole of the laminated disc substrates on both sides thereof, each hub having a portion to cover a portion of the laminated disc substrate in the vicinity of the center hole, and adhesive layers to be formed between said hubs and said laminated disc substrates and between said hubs.

In the information recording discs of the present invention, a plurality of disc substrates usually two disc substrates, at least one of which has a recording medium containing layer, are laminated so that the recording medium containing layers face to each other, and these disc substrates may be laminated directly or via spacers with adhesives or by means of ultrasonic welding technique.

Materials used for forming the disc substrate, outer peripheral spacer and inner peripheral spacer are thermoplastic resins such as polycarbonates, polymethyl methacrylates and polyolefins. Preferably useful resins are copolymers of ethylene and cycloolefins represented by the following general formula [I] or [II]. Preferred copolymers are those which contain 40–85 mol %, preferably 50–80 mol % of ethylene. Particularly preferred resins for forming the disc substrate include, for example, cycloolefin type random copolymer compositions formed from components:

(A) a cycloolefin type random copolymer comprising an ethylene component and a cycloolefin component represented by the following general formula [I] or [II], said copolymer having an intrinsic viscosity $[\eta]$ of 0.05–10 dl/g as measured in decalin at 135° C. and a softening temperature (TMA) of not less than 70° C., and (B) a cycloolefin type random copolymer comprising an ethylene component and a cycloolefin component represented by the following general formula [I] or [II], said copolymer having an intrinsic viscosity [η] of 0.01-5 dl/g as measured in decalin at 135° C. and a softening temperature (TMA) of less than 70° C., the weight ratio of said component (A)/component (B) being 100/0.1 to 100/10. Preferably, the component (A) contains 40-95 mol %, preferably 40-85 mol %, more preferably 50-75 mol % of ethylene, and the component (B) contains 60-98 mol %, preferably 60-95 mol % of ethylene,

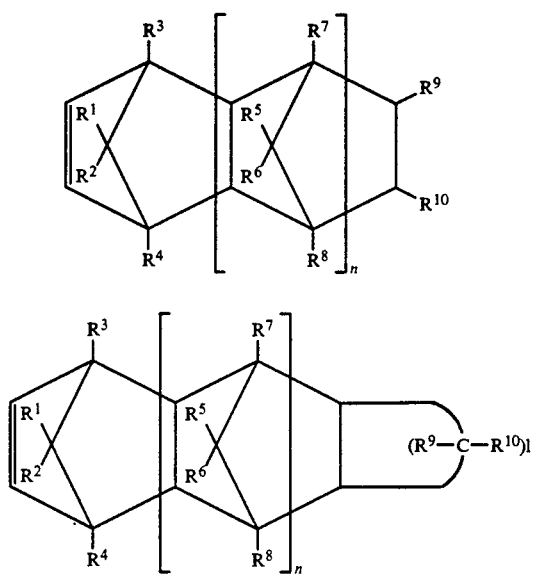

wherein n and m are each zero or a positive integer, l is an integer of 3 or more, and $R^1$ to $R^{10}$ each represent hydrogen atom, halogen atom or hydrocarbon group.

Useful hubs may be those made of metals, magnetic material-blended plastics, or metallic plate-attached plastics. From the standpoint of strength and mass-productivity, however, preferred are the metallic plate-attached plastics as mentioned above. The plastics used in the above-mentioned are desirably polycarbonates from the viewpoint of strength and costs, though any resins such as thermosetting resins and the like may be used in addition to the above-illustrated thermoplastic resins. Adhesives used for bonding hubs to each other, and hubs to disc substrates are preferably those of epoxy type, particularly epoxy resins of ultraviolet-curing type, though any adhesives other than those mentioned above are also usable.

Information recording discs as referred to in the present invention are intended to include all discs which are capable of recording information on the recording medium containing layers thereof, such optical discs are flexible optical discs.

The information recording discs of the present invention may be assembled by laminating disc substrates directly or via an outer spacer and an inner spacer with adhesives or by means of ultrasonic welding technique so that recording medium containing layers of said disc substrates face to each other, inserting into a center hole of the laminated disc substrates hubs each having a portion to be inserted into said center hole from both sides of said laminated disc substrates to fit said hubs in the center hole, and charging adhesive layers into between the hubs and disc substrates and between the hubs to bond them to each other.

In the information recording discs of the present invention, since the hubs are in contact with the disc substrates by way of the portions of said hubs to be inserted into the center hole of the laminated disc substrates and flange portions of the hubs, said hubs are bonded to each other with an adhesive layer while the hubs and disc substrates are bonded to each other with adhesive layers, and the disc substrates are integrally assembled with the hubs, the inner peripheral portion of the information recording disc is reinforced and the laminated structural strength of said disc is increased.

EFFECT OF THE INVENTION

In the present invention, since the hubs each having the portion thereof to be inserted into the center hole of the disc substrates to be laminated and the flange portion are fitted into said center hole from both sides thereof and the adhesive layers are formed between said hubs and said disc substrates and between said hubs themselves, the information recording discs obtained thereby are excellent in anchoring strength by virtue of the fact that the laminated inner peripheral portion of said information recording discs is reinforced by a simple assembling operation.

EMBODIMENT OF THE INVENTION

Figure 2:
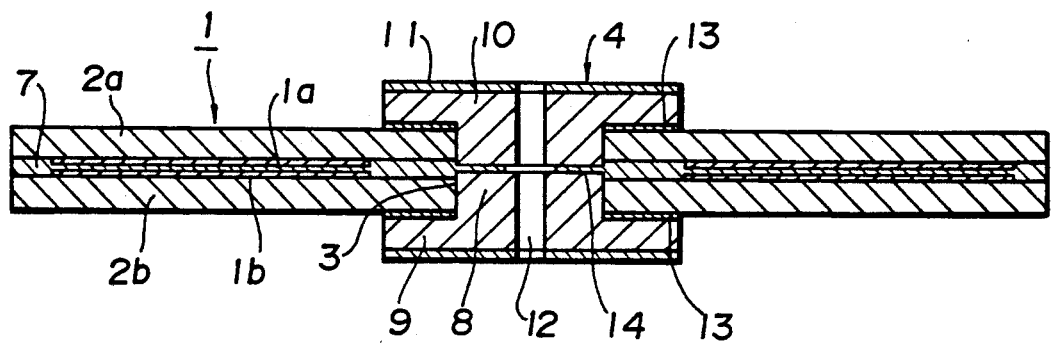
Figure 3:
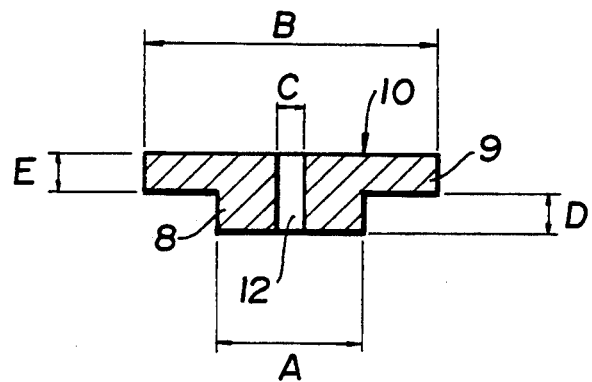
FIG. 3 is a sectional view showing a main body of hub.

The present invention is illustrated below with reference to embodiment as expressed in terms of figures shown in the accompanying drawings. FIGS. 1 and 2 are sectional views showing separate embodiments of the information recording discs of the present invention, respectively, and FIG. 3 is a sectional view showing a main body of the hub.

In the figures, 1 is an information recording disc of a structure wherein the hubs 4 are fitted in a center hole of two disc substrates 2a and 2b being laminated so that recording medium containing layers 1a and 1b face to each other. In FIG. 1, the disc substrates 2a and 2b are superposed upon each other via an outer peripheral spacer 5 and an inner peripheral spacer 6 and laminated by the ultrasonic welding technique to an air sandwich structure, whereas in FIG. 2 said disc substrates 2a and 2b are directly laminated with an adhesive layer 7. The hubs 4 each comprise a main body 10 made of plastics and having a portion 8 to be inserted into the center hole 3 and a flange portion 9, a metallic plate 11 being fixed to the surface of the main body 10, and a hole 12 perforated at the center thereof. The metallic plate 11 is anchored to the hub main body 10 by means of cut and raised points of projections formed on said metallic plate 11 and so designed as to be driven by mechanical or magnetic force (detailed diagrammatic illustration in this respect is omitted). The portions 8 of the hubs 4 are so designed to be inserted into the center hole 3, and the flange portions 9 of the hubs 4 are so designed to cover the laminated disc substrates 2a and 2b in the vicinity of the center hole 3. Adhesive layers 13 are formed between the flange portions 9 of the hubs 4 and the laminated disc substrates 2a and 2b, and an adhesive layer 14 is formed between the portions 8 of the hubs 4, and thus all the constituents parts are integrally anchored to one another to a solid structure.

The information recording discs 1 comprising the continuent parts as shown in FIGS. 1 and 2 are manufactured by laminating the disc substrates 2a and 2b directly with the adhesive layer 7 or by means of the ultrasonic welding technique via the outer peripheral spacer 5 and the inner peripheral spacer 6 so that the recording medium containing layers 1a and 1b face to each other, inserting the portions 8 of the hubs 4 into the center hole 3 from both sides thereof, charging the adhesive layers 13 between the flange portions 9 of the hubs 4 to anchor them to each other, and charging the adhesive layer 14 between the portions 8 of the hubs 4 to anchor them to each other.

In the information recording discs 1 thus manufactured, since the hubs 4 are in contact with the disc substrates 2a and 2b by way of the portions 8 and flange portions 9 of said hubs 4, and the hubs 4 themselves are bonded to each other by means of the adhesive layer 14 while the hubs 4 and the disc substrates 2a and 2b are bonded to each other by means of the adhesive layers 13, all the constituent parts are integrally formed to a solid structure, whereby the inner peripheral portion of the solid structure is reinforced to increase lamination strength thereof.

Figure 4:
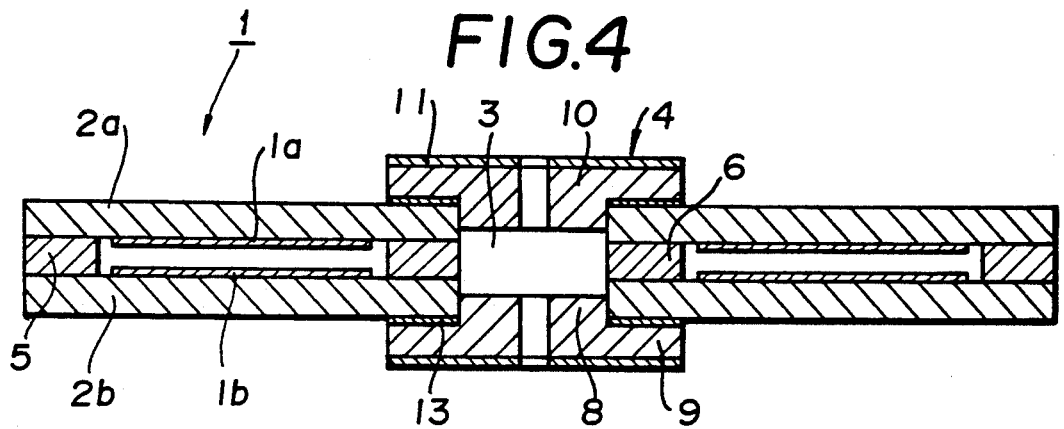
FIGS. 4 and 5 are sectional views showing comparative examples, respectively.
Figure 5:
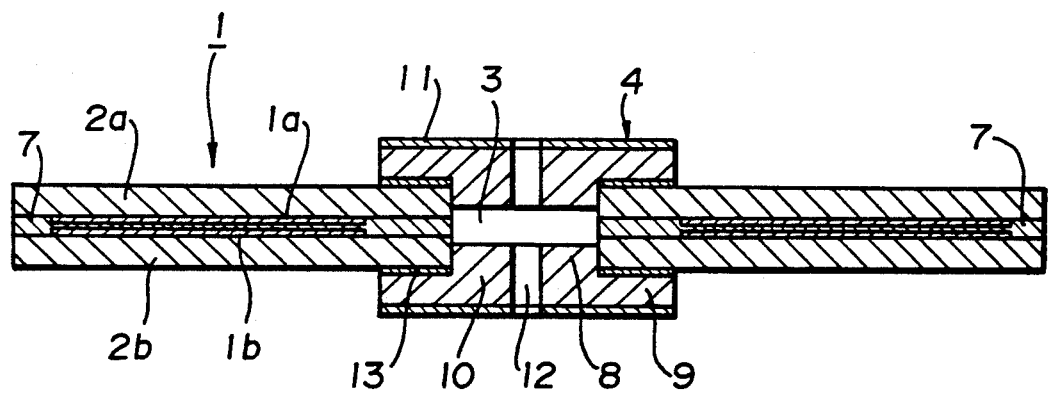

FIGS. 4 and 5 are sectional views showing comparative examples of information recording discs, respectively. The information recording discs respectively represented by FIGS. 4 and 5 are similar in structure to those shown in FIGS. 1 and 2. In these information recording discs, however, the portions 8 of the hubs 4 to be inserted into the center hole 3 is short in length and no adhesive layer is formed between said portions 8 for the purpose of bonding them to each other. Accordingly, in the information recording discs as shown in FIGS. 4 and 5, respectively, the inner peripheral portion thereof is low in strength.

Illustrated below are test examples of the information recording discs of the present invention and comparative examples.

In the information recording discs of FIGS. 1, 2, 4 and 5, respectively, the aforementioned polyolefin resin was used for forming the disc substrates 2a and 2b, and the outer peripheral spacer 5 and inner peripheral spacer 6, polycarbonate was used for forming the main body 10 of the hubs 4, and an epoxy type resin was used for forming the adhesive layers 7, 13 and 14, respectively. The disc substrates 2a and 2b both had an outside diameter of 130 mm, an inside diameter of 15 mm, and a thickness of about 1.2 mm. The main body 10 of the hubs 4 of FIG. 1 had A=15 mm, B=25 mm, C=4 mm, D=1.45 mm and E=2 mm in the main body 10 as shown in FIG. 3, while the value of D in the main body 10 of FIGS. 2, 4 and 5, respectively, was varied. These information recording discs as illustrated above were subjected to drop test wherein they were allowed to drop from a height of 1 m.

As the result, debonding was partly observed in the outer peripheral space 5 of the disc of FIG. 1 when dropped 15 times, and the test was continued, whereupon no debonding of the hubs 4 and the inner peripheral spacer 6 was observed even when said disc was allowed to further drop 50 times. Furthermore, the disc shown in FIG. 1 had an adhesion strength of at least 10 kg/cm$^2$ between the hub and substrate, and also passed the delamination test continuously repeated at least 100,000 times. The disc of FIG. 2 was kept for 1000 hours in an oven at 70° C. and 90% RH, and then subjected likewise to the test, whereupon no debonding of the hubs 4 occurred even when said disc was allowed to drop 50 times. In contrast thereto, debonding was partly observed in the inner peripheral spacer of the disc of FIG. 4 when said disc was allowed to drop 12 times. Furthermore, the disc shown in FIG. 4 had an adhesion strength of 5 kg/cm$^2$, and also failed to pass the delamination test continuously repeated less than 100,000 times. The disc of FIG. 5 was subjected to the same environmental test as in the case of the disc of FIG. 2, and then subjected to the drop test likewise, whereupon the hubs 4 were detached when said disc was allowed to drop 37 times.

In this connection, the adhesion strength was measured with an Intesco Universal Material Tester of 210 Model and a tensile instrument.

The drop test was conducted by dropping the disc placed in a cartridge from a height of 1.5 m onto a plastic tile of the floor, and the test was repeated continuously until the hub peels off from the substrate to record the number of times of the test repeated at which said hub peeled off finally.

The delamination test was conducted by repeating delamination of the disc using a driving device until the hub peels off from the substrate to check the number of times of the test repeated at which the hub peeled off finally.

From the results obtained above, it is understood that the information recording discs of the present invention are excellent in strength of the inner peripheral portion thereof and hard to subject to detachment, as compared with those of comparative examples.

What is claimed is:

1. An information recording disc comprising a plurality of disc substrates, at least one of which has a recording medium containing layer, and which are laminated on each other by a first adhesive layer extending over substantially the whole area of those surfaces facing each other, two pieces of hubs mounted over a center hole of said disc substrates on both sides thereof, each hub having an insertion portion to be inserted into said center hole, said insertion portion having an end surface of a predetermined area, said end surface being flat over the entirety of said area, and a flange portion to cover a portion of said disc substrate in the vicinity of said center hole, and additional adhesive layers formed between said hubs and said disc substrates and between said end surfaces of the insertion portions of hubs.

2. The information recording disc as claimed in claim 1 wherein the plurality of the disc substrates are laminated with an adhesive.

3. The information recording disc as claimed in claim 1 wherein the adhesive layer is composed of an ultraviolet-curing type adhesive.

4. An information recording disc comprising:
   a plurality of disc substrates, at least one of which has a recording medium containing layer, and which are laminated on each other by a first adhesive layer extending over substantially the whole area of those surfaces facing each other,
   two pieces of hubs mounted over a center hole of said disc substrates on both sides thereof, each hub having an insertion portion to be inserted into said center hole, said insertion portion an end surface of a predetermined area, said end surface being flat over the entirety of said area,
   a flange portion to cover a portion of said disc substrate in the vicinity of said center hole, said flange portion having an outer terminal end surface,
   a metallic plate covering at least a part of said outer terminal end surface, and
   additional adhesive layers formed between said hubs and said disc substrates and between said end surfaces of the insertion portion of hubs.

* * * * *